Oct. 7, 1969  M. GROSJEAN  3,471,240
RECORDING APPARATUS FOR THE MEASUREMENT OF CIRCULAR DICHROISM
Filed Jan. 27, 1965  2 Sheets-Sheet 1

INVENTOR
MARC GROSJEAN
BY *Hammond & Littell*
ATTORNEYS

United States Patent Office 3,471,240
Patented Oct. 7, 1969

3,471,240
RECORDING APPARATUS FOR THE MEASUREMENT OF CIRCULAR DICHROISM
Marc Grosjean, Paris, France, assignor to Les Laboratoires Francais de Chimiotherapie, Paris, France, a corporation of France
Filed Jan. 27, 1965, Ser. No. 428,493
Int. Cl. G01n 21/40
U.S. Cl. 356—117          6 Claims

ABSTRACT OF THE DISCLOSURE

Apparatus for the measurement of circular dichroism of an optically active product comprising a light-source of extended wave-length band, means for forming the light of said source into a rectilinearly polarized monochromatic light beam, a light polarization modulator means, said modulator means imparting a periodic variation from right to left circular polarization conditions and back to said rectilinearly polarized monochromatic light beam, a sample holder for containing said optically active product positioned to provide passage of said modulated and polarized light beam through the sample of said active product, an electro-optical converter receiving said light beam passed through said sample holder, circuit means deriving, from the output signal of said electro-optical converter, an electrical signal, representative of the difference of the absorption coefficients of said sample of active product for said right and left circular polarization conditions, at the wave-length of said monochromatic light and means for directly recording said electrical signal, wherein said means for forming said light into a rectilinearly polarized monochromatic light beam are comprised of an additive series of at least two elementary monochromator members each of which includes a dispersion prism and an exit slit, one at least of said prisms refracting the impinging light thereon in a single beam and one at least of said prisms refracting the impinging light thereon in two angularly separated rectilinearly polarized light beams and the exit slit associated to that prism being diaphragmed for elimination of one of said angularly separated beams.

---

Figure 1:
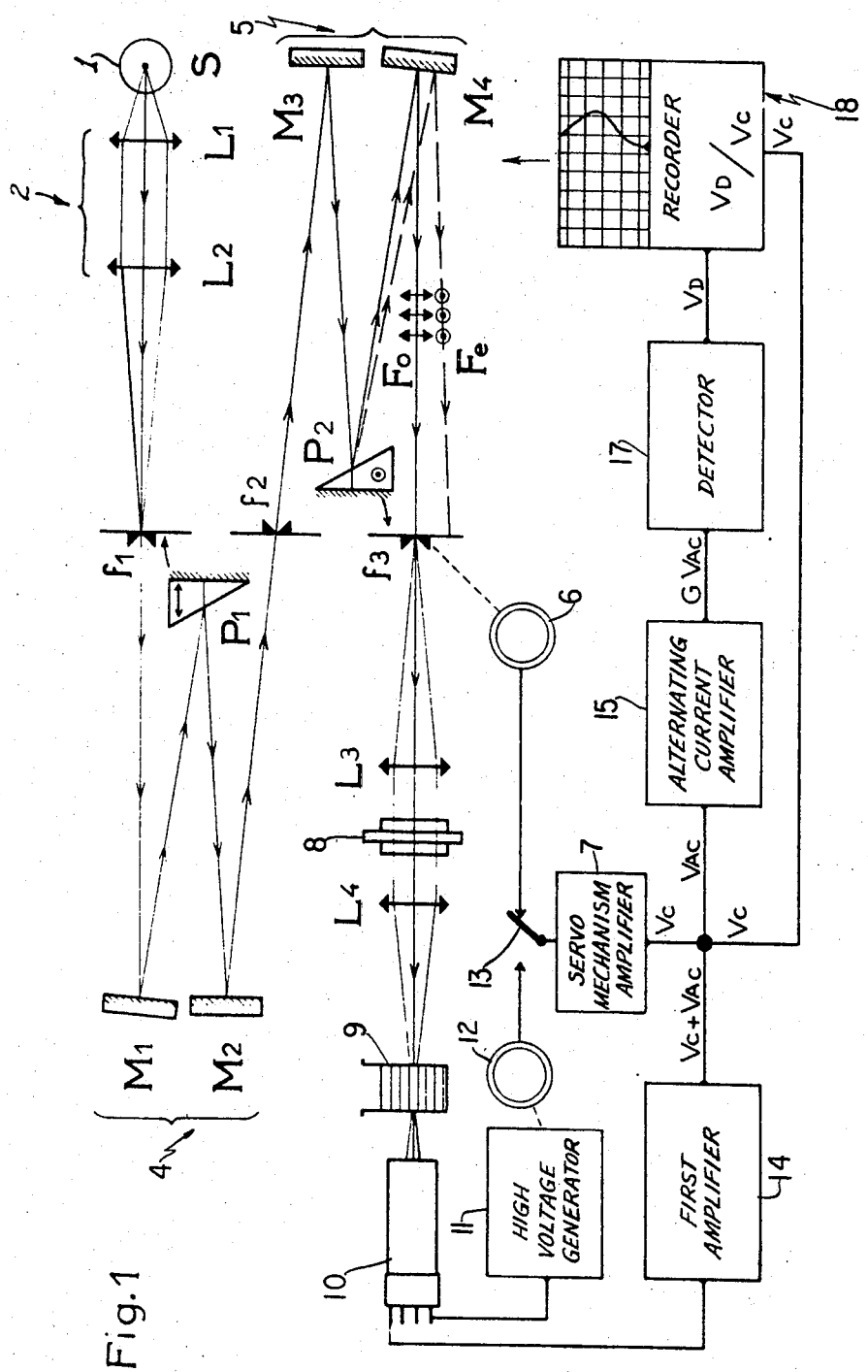

This application relates to the perfection, modification and additions for the design of the recording apparatus for the measurement of the circular dichroism of optically active substances as described in my previous application Ser. No. 119,963, filed June 27, 1961, now Patent No. 3,257,894.

The object of this invention is to increase the precision of the measurements, in particular by means of improvement of the optical system of the apparatus, and to increase its reliability and operational convenience, especially by improvements made on the control circuits of its recorder.

The apparatus in conformance with the parent application Ser. No. 119,963, of which this application is a continuation-in-part, is essentially based on the formation of a monochromatic beam, the polarization of which can be changed from a right circular to a left circular polarization and which can traverse a sample of the optically active substance, the conversion of this beam into an electrical signal which is separated into the alternate and direct current components, the first of which is afterwards rectified, and the control by the direct current, and rectified components of a recorder which thereby furnishes their ratio, the latter measuring the circular dichroism of the sample under investigation. As the measurements are to be carried out over a spectral region covering the ultra-violet and visible spectrum, the wave-length of the beam is slowly changed in order to ensure the scanning of the desired frequency spectrum and to record directly the variations of the circular dichroism of the sample under investigation, as a function of the wave-length of the light which it traverses.

In a more precise manner, the apparatus of the parent application uses a monochromator with quartz optics, or grating, whose dispersive system is driven as a function of time, according to a known and reproducible law, the slits of this monochromator being actuated by a servo-mechanism controlled by the difference between the voltage of the direct current component of the electrical signal and an adjustable reference voltage. The conversion of the light flux into an electrical signal is ensured by a photomultiplier which is followed by a direct current separating amplifier. The alternating current component at the output of this amplifier, is amplified, then rectified by an averaging phase-sensitive rectifier system synchronized with the frequency of the polarization modulator, and the direct current component of the said amplifier is rendered symmetric with respect to the ground. The recorder then compares the two components thus modified, and records their ratio as a function of wavelength.

In this type of apparatus, the precision is limited especially by the ratio: useful signal/background signal of the photomultiplier. The other sources of noise may, in fact, be kept at a minimum by careful arrangement and choice of the components and circuits. To increase the precision, it is advisable fundamentally to increase the light flux falling on the cathode of the photomultiplier, the optical density of the sample having been adjusted by the operator, in order that, other things being equal, the precision should have an optimum value, and at the same time, the time constant of the filter circuits having been adjusted, taking into account the necessity to record spectra at a speed consistent with an industrial operation of the apparatus (the more this time constant is increased, the slower the wavelength scanning should be).

To increase the precision of the measurements performed with an apparatus conforming to the parent application, it is essentially intended, according to a characteristic of the present invention, to construct the monochromator assembly in the form of a system comprising at least two elementary monochromators in additive series, the outlet slit of the first forming the inlet slit of the second. The slits are arranged in alignment, permitting a direct and general control by means of the servo-mechanism to maintain a constant value of the direct current component of the signal of the photocell. Furthermore, each of these elementary monochromators has a prism mounted on a common rotating support permitting the wavelength scanning.

According to another characteristic of the invention the prism used in the second monochromator serves at the same time as a dispersive agent and as a means of producing plane-polarized light.

According to another characteristic of the invention, not necessarily utilized in practice, in this type of assembly, the slit width may be left fixed and the servo-mechanism then controls the dynode voltage of the photomultiplier, for example, or in a more general manner the gain of the amplifier following the photocell.

According to still another characteristic of the invention, the direct current component is no longer made symmetric with respect to the ground, but is directly applied to the slidewire of the recorder, the detection of the alternating current component being achieved in such a way that, nevertheless, the recorder may record positive or negative rectified voltages.

Figure 2:
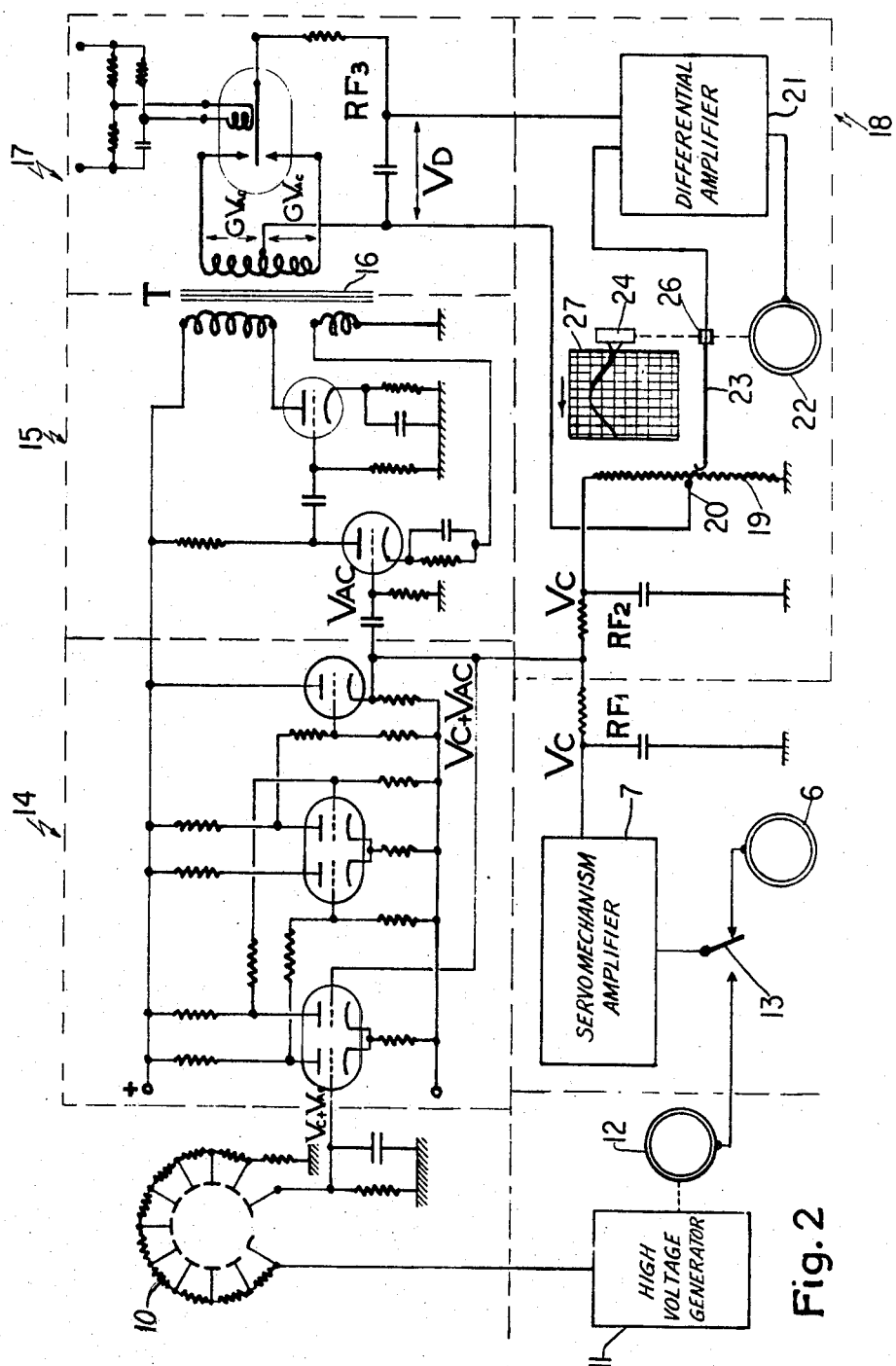

These characteristics, in the same way as others serving to improve further the apparatus, will be explained in detail by referring to an example which is illustrated in the attached diagrams where FIG. 1 is a general diagram of the apparatus;

FIG. 2 is a diagram showing the electric circuits in detail.

It will be understood, that the embodiment described is not intended to limit the invention thereto and that various modifications will be apparent within the scope of the invention.

Referring to FIG. 1, which shows one embodiment of the invention a light source 1 at S illuminates by means of a condenser 2, whose lenses are indicated as $L_1$ and $L_2$, a monochromator unit comprising two monochromators 4 and 5 arranged in series, from the inlet slit $f_1$ of monochromator 4, to the outlet slit $f_3$ of monochromator 5, the intermediate slit $f_2$ serving for both monochromators. Each monochromator 4 and 5 has an optical path of N shape, which permits the limitation to a minimum of the extra-axial aberration of the type "comma." The three slits are in alignment, slits $f_1$ and $f_3$ being curved and of identical curvature, but symmetrically orientated in relation to slit $f_2$, which is straight mechanically. Those slits are connected to be simultaneously activated by motor 6 controlled by the servo-mechanism amplifier 7, when the contact 13 is, at the output of the amplifier, disposed on its contact on the right (as shown in FIGS. 1 and 2).

The light path of the first monochromator 4 proceeds from slit $f_1$ to slit $f_2$ through mirror $M_1$, prism $P_1$ and mirror $M_2$. The light path of the second monochromator 5 proceeds from slit $f_2$ to slit $f_3$, through mirror $M_3$, prism $P_2$ and mirror $M_4$. Prisms $P_1$ and $P_2$ are mechanically interdependent, for example, mounted on the same turret which is driven by the control motor of the wavelength drive of the monochromator unit, motor not shown. Assembly and operation of the prism drives is similar to that shown in the parent application. The beam starting out from $f_3$ falls on the lens $L_3$ of which more use will be seen later. The monochromator unit may be made airtight from lens $L_1$ to lens $L_3$ and a non-absorbing gas, such as nitrogen, may be caused there to circulate, when working between 1850 and 2000 A.

Prisms $P_1$ and $P_2$ are of suitable material, synthetic quartz for example, very transparent in the ultra-violet range and they are shaped substantially at an angle of 30° adjacent to their reflecting face, which may be aluminized, for example. They are arranged in order that the light traverses $P_1$ near the optical axis and at minimum deviation. The cut of prism $P_2$ is such that the optical axis of the crystal is parallel with the refracting edge. The light traversing the prism $P_1$ is, therefore, reflected with the ordinary index. The beam incident on the prism $P_2$ is reflected in two beams polarized at right angle, the ordinary beam $F_o$ is selected and traverses the slit $f_3$, whereas the extra-ordinary beam $F_e$ is eliminated, as indicated, in the vicinity of this slit.

It may be seen at this point that with the arrangement, which will be more fully described later, not only is the light for a given bandwidth twice as strong as with a simple monochromator, and more pure with respect to stray light, but it is already polarized at the outlet of the monochromator unit.

It might appear that the light losses may be more considerable than in a simple monochromator, but one can verify that the absorption losses of the prism $P_2$ are not greater than those of a Rochon prism (or similar) as used in the parent application, and the losses by reflection do not substantially weaken the ordinary beam which is used, since the angle of incidence on the prism $P_2$ is near to the angle of Brewster.

The outlet slit $f_3$ of the monochromator unit 5, accordingly provides a plane-polarized light beam, for the polarization modulator 8, made from a crystal presenting a Pockel's effect for instance. This one may be with transparent electrodes through which an alternating excitation electric field is applied, as is well known. Since modulator 8 only works well for a beam with a small angular aperture, the beam emerging from the slit $f_3$ is transformed into a parallel beam by the lens $L_3$. On the other side of the crystal modulator 8, a lens $L_4$ focusses the modulated beam on the sample cell 9 containing the sample of the optically active product under investigation. The image of the slit $f_3$ is formed in the plane of the sample cell 9, which permits working with a small amount of product. The lenses $L_3$ and $L_4$, for instance, are of fused quartz and have then no birefringence.

The light beam traversing the cell 9 falls then on the photocathode of a photomultiplier 10, the dynodes of which are supplied by a high voltage generator 11 (see electrical diagram FIG. 2). The dynode voltage is controlled by a reference potentiometer which may be driven by hand, or when the contact 13 is on the left position, by the motor 12 controlled by the servo-mechanism amplifier 7.

The output voltage of the photomultiplier 10 is applied to a first amplifier 14 of gain G=1 (unit) and which is a direct current separating amplifier with two double-triode stages and a cathodyne output stage (see FIG. 2). The output voltage is fed back to the second grid of the first double-triode, the first grid of which receives the signal of the photocell 10. The gain of this separating amplifier need not necessarily be exactly unity, since the two voltage components, alternating and direct, traverse the amplifier together and consequently without modification of their ratio, whichever may be the gain. It should be understood that the actual design of this direct current amplifier 14 incorporates the customary means of zero adjustment and anti-oscillation, not shown to simplify the diagram.

At the low-impedance output of amplifier 14, three circuits are connected: the alternating current amplifier 15, the input of the servo-mechanism amplifier 7 through a filtering system $RF_1$, and an input to the recorder through a filtering system $RF_2$.

Amplifier 15 is a feedback amplifier in which a feed-back voltage is taken from an additional coil of its output transformer 16. The feedback is especially intended to improve the stability of gain with respect to time, and bring about a better linearity of response. The gain G with feedback may be of the order of 100 for example. The output signal of amplier 15 is a complex signal where nevertheless a component with the modulation frequency of modulator 8 prevails among the odd harmonics. The noise signal is frequently greater than the useful signal and provision must be made for the amplifier not to be saturated by noise, at any moment so that the useful signal can be detected correctly. In the representation of amplifier 15 for reasons of simplification, the anti-oscillation circuits have been omitted.

The signal across the secondary winding of transformer 16 is detected by a full-wave averaging phase-sensitive detector 17 fed in phase with the energizing voltage of the crystal modulator 8. This well known detection system allows the minimization of the disturbing effect of the background noise of the cell 10 and further presents the advantage of being perfectly linear in its response even for small signals of either sign. For the background noise the assembly comprising: amplifier 15, detector 17 and filter $RF_3$ acts as a selective amplifier whose band pass is only twice the band pass of the filter $RF_3$ and the noise gives there no direct current detected voltage. In the filter $RF_3$, the filtering condenser at whose terminals the detected voltage $V_D$ is taken, is associated with a resistance high enough so that the detector be averaging and so that the noise interference be kept to a minimum.

The voltage $V_C$ freed from the alternating component and from the noise by means of the filter system $RF_2$ with identical time constant as $RF_3$, is applied to the potentiometer bar 19 of the recorder 18 and a contact 20, adjusted on bar 19 is connected to the center tap of the secondary coil of transformer 16. This set-up ensures that the detected voltage $V_D$ is based on this point which will serve as zero for the measurement. The rest of the recorder assembly is customary, the voltage $V_D$ being compared with the fraction of the voltage $V_C$ taken on the potentiometer bar 19 by the recording slide 23, the difference between these two voltages being amplified in the differential amplifier 21, and driving the servo-motor 22. The recording pen 24 is mechanically connected to the recorder slide 23 by the coupling 26.

Recorder 18 may comprise any of well known devices for continuously recording information by variation in electrical current. For illustrative purposes, recorder 18 has been shown as the type which includes continuously movable graph paper 27, moving in the direction indicated by the arrow and traveling under pen 24, whereby the curve is traced as pen 24 moves as described above. The movement of graph paper 27 is by electrical or mechanical means (not shown) well known in the art, and is at any desired speed, which is correlated with the scanning of the light wavelength.

In order to have a good damping of the recorder it is necessary to have a constant loop gain. This may be done, for example, by maintaining $V_C$ constant. For this purpose $V_C$ is compared to a fixed reference voltage, and the difference between these two voltages is amplified in the servo-mechanism amplifier 7, which can according to the desire of the user either control the opening of the slits ($f_1$, $f_2$, $f_3$) of the monochromator unit 3 by means of the servo-motor 6, or control the gain of the photomultiplier 10 by control of its dynode voltage generator 11 by means of the servo-motor 12. These two means are preferably placed at the disposal of the user for his free choice between them.

As a modification it would be possible to record directly the detected voltage $V_D$ if by other means, the unit is such as to maintain $V_C$ exactly constant which necessitates the recourse to a unit with a very fast response, i.e. the recourse to a purely electronic system. A constant voltage, equal to $V_C$, would then have to be applied on the potentiometer bar of the recorder. Such a variant, which does not modify the process of measurement, is obviously included within the scope of the invention.

While certain specific embodiments and preferred modes of practice of the invention have been set forth it will be understood that this is solely for the purpose of illustration and that various changes and modification may be made without departing from the spirit of the disclosure.

I claim:

1. Apparatus for the measurement of circular dichroism of an optically active product comprising a lightsource of extended wave-length band, means for forming the light of said source into a rectilinearly polarized monochromatic light beam, a light polarization modulator means, said modulator means imparting a periodic variation from right to left circular polarization conditions and back to said rectilinearly polarized monochromatic light beam, a sample holder for containing said optically active product positioned to provide passage of said modulated and polarized light beam through the sample of said active product, an electro-optical converter receiving said light beam passed through said sample holder, circuit means deriving, from the output signal of said electro-optical converter, an electrical signal, representative of the difference of the absorption coefficients of said sample of active product for said right and left circular polarization conditions, at the wave-length of said monochromatic light and means for directly recording said electrical signal, wherein said means for forming said light into a rectilinearly polarized monochromatic light beam are comprised of an additive series of at least two elementary monochromator members each of which includes a dispersion prism and an exit slit, one at least of said prisms refracting the impringing light thereon in two angularly separated rectilinearly polarized light beams and the exit slit associated to that prism being diaphragmed for elimination of one of said angularly separated beams.

2. The apparatus of claim 1, wherein said prism refracting the light in a single beam is cut and disposed with its optic axis oriented substantially in the direction of the impinging light, and said prism refracting the light in two angularly separated beams is of birefringent material cut with the optic axis substantially perpendicular to the impinging and emerging light.

3. The apparatus of claim 1, wherein each elementary monochromator member comprises entrance and exit slits, each exit intermediate slit also comprising the entrance slit of the next member, and said circuit means includes means for separating the D.C. component from the output signal of said electro-optical converter, said circuit means further including a zero-error servo-mechanism coupled to said slits to simultaneously control said slits for maintaining a substantially constant value of the said D.C. component.

4. The apparatus of claim 1, wherein, the said electro-optical converter comprises a photoelectric cell device with high voltage supply source, and said circuit means includes means for separating the D.C. component from the output signal of said electro-optical converter, said circuit means further including a zero-error servo-mechanism coupled to said high voltage supply to control said high voltage supply source for maintaining a substantially constant value of the said D.C. component.

5. The apparatus of claim 1, wherein, said circuit means includes means for separating the D.C. component from the output signal of said electro-optical converter, and further including means for detecting the A.C. component from the output signal of said electro-optical converter, and said means for recording said electrical signal includes a potentiometer bar coupled to and fed with the output of said A.C. component detecting means, said potentiometer bar being connected across an output of said D.C. component separating means and a fixed potential point and an intermediate tap on said potentiometer bar being connected to an output of said A.C. component detecting means.

6. The apparatus of claim 5, wherein identical filter networks are respectively connected in the outputs of said D.C. component separating means and said A.C. component detecting means.

References Cited
UNITED STATES PATENTS

| | | |
|---|---|---|
| Re. 26,053 | 7/1966 | Cary. |
| 2,874,608 | 2/1959 | Beloian. |
| 3,155,762 | 11/1964 | Gillham et al. |
| 3,164,662 | 1/1965 | Grosjean et al. |
| 3,247,758 | 4/1966 | Turner. |
| 3,257,894 | 6/1966 | Grosjean |
| 3,283,644 | 11/1966 | Saltzman. |
| 3,312,141 | 4/1967 | Cary. |
| 3,316,412 | 4/1967 | Hirschberg. |

FOREIGN PATENTS 1,269,237   7/1961   France.

OTHER REFERENCES

Gates, J. W., An Automatic Recording Saccharimeter, Chemistry and Industry, Feb. 15, 1958, pp. 190–193.

RONALD L. WIBERT, Primary Examiner

T. R. MOHR, Assistant Examiner

U.S. Cl. X.R.

356—114

UNITED STATES PATENT OFFICE
CERTIFICATE OF CORRECTION

Patent No. 3,471,240  Dated October 7, 1969

Inventor(s) Marc Grosjean

It is certified that error appears in the above-identified patent and that said Letters Patent are hereby corrected as shown below:

Column 1, lines 4 and 5, "Les Laboratoires Francais de Chimiotherapie" should read -- ROUSSEL UCLAF --; line 7, "Filed" should read -- Continuation-in-Part of Application Serial No. 119,963, June 27, 1961. This application --. Column 3, line 45, "comma" should read -- coma --.

Signed and sealed this 1st day of September 1970.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,471,240                    Dated  October 7, 1969

Inventor(s)  Marc Grosjean

It is certified that error appears in the above-identified patent and that said Letters Patent are hereby corrected as shown below:

In the heading to the printed specification, after line 7, insert -- Claims priority, France, Feb. 6, 1964, 962,863 --.

Signed and sealed this 20th day of April 1971.

(SEAL)
Attest:

EDWARD M.FLETCHER,JR.                   WILLIAM E. SCHUYLER, JR.
Attesting Officer                       Commissioner of Patents